United States Patent
Pochorovski et al.

(10) Patent No.: US 12,024,585 B2
(45) Date of Patent: Jul. 2, 2024

(54) PROCESS FOR CARBODIIMIDIZATION

(71) Applicant: Covestro Deutschland AG, Leverkusen (DE)

(72) Inventors: Igor Pochorovski, Bergisch Gladbach (DE); Frank Richter, Leverkusen (DE); Kathleen Fuchs, Heidelberg (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 17/798,662

(22) PCT Filed: Feb. 11, 2021

(86) PCT No.: PCT/EP2021/053266
§ 371 (c)(1),
(2) Date: Aug. 10, 2022

(87) PCT Pub. No.: WO2021/165126
PCT Pub. Date: Aug. 26, 2021

(65) Prior Publication Data
US 2023/0090655 A1    Mar. 23, 2023

(30) Foreign Application Priority Data
Feb. 18, 2020 (EP) .................... 20157825

(51) Int. Cl.
| | | |
|---|---|---|
| C08G 18/79 | (2006.01) | |
| C08G 18/02 | (2006.01) | |
| C08G 18/16 | (2006.01) | |
| C08G 18/75 | (2006.01) | |

(52) U.S. Cl.
CPC ......... *C08G 18/797* (2013.01); *C08G 18/025* (2013.01); *C08G 18/168* (2013.01); *C08G 18/758* (2013.01)

(58) Field of Classification Search
CPC .. C08G 18/797; C08G 18/025; C08G 18/168; C08G 18/758
See application file for complete search history.

(56) References Cited

U.S. PATENT DOCUMENTS

| | | |
|---|---|---|
| 2,840,589 A | 6/1958 | Smeltz |
| 2,853,473 A | 9/1958 | Campbell et al. |
| 2,941,966 A | 6/1960 | Campbell |
| 3,931,059 A | 1/1976 | La et al. |
| 4,294,719 A | 10/1981 | Wagner et al. |
| 4,344,855 A | 8/1982 | Schafer et al. |
| 5,202,358 A | 4/1993 | Scholl et al. |
| 5,354,888 A | 10/1994 | Scholl |
| 6,120,699 A | 9/2000 | Narayan et al. |
| 2012/0065424 A1 | 3/2012 | Spyrou et al. |

FOREIGN PATENT DOCUMENTS

| | | |
|---|---|---|
| EP | 0628541 A1 | 12/1994 |
| GB | 1215157 A | 12/1970 |

OTHER PUBLICATIONS

Nykaza T.V. et al, "A Biphilic Phosphetane Catalyzes N—N Bond-Forming Cadogan Heterocyclization via PIII and PV = O Redox Cycling", J Am Chem Soc 2017, 139, 6839-6842.
International Search Report, PCT/EP2021/053266, date of mailing: May 14, 2021.

*Primary Examiner* — Rabon A Sergent
(74) *Attorney, Agent, or Firm* — The Webb Law Firm

(57) ABSTRACT

The invention relates to polycarbodiimides and to a process for their preparation using special catalysts.

16 Claims, No Drawings

PROCESS FOR CARBODIIMIDIZATION

CROSS-REFERENCE TO RELATED APPLICATIONS

This application is a national stage application under 35 U.S.C. 371 of PCT/EP2021/053266, filed Feb. 11, 2021, which claims the benefit of European application no. 20157825.9, filed Feb. 18, 2020, each of which is incorporated herein by reference.

BACKGROUND

The present invention relates to polycarbodiimides and a process for the preparation thereof.

In general terms, carbodiimide groups can be obtained in a simple manner from two isocyanate groups with the elimination of carbon dioxide:

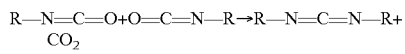
R—N=C=O+O=C=N—R→R—N=C=N—R+ $CO_2$

Starting from diisocyanates, oligomeric compounds having several carbodiimide groups and optionally isocyanate groups, particularly terminal isocyanate groups, are thus obtainable, so-called polycarbodiimides.

The preparation of polycarbodiimides from diisocyanates is known per se and is described, for example, in U.S. Pat. Nos. 2,840,589, 2,853,473, 2,941,966 and EP-A 628541. As catalysts for the carbodiimidization (carbodiimidization catalysts) of isocyanates, compounds of phosphorus have proven successful, such as various phospholene oxides, for example 1-methyl-2 (and/or 3)-phospholene-1-oxide, 3-methyl-2 (and/or 3)-phospholene-1-oxide, 1-phenyl-2 (and/or 3)-phospholene-1-oxide, 1-phenyl-3-methyl-2 (and/or 3)-phospholene-1-oxide and 1-ethyl-2 (and/or 3)-phospholene oxide. Phospholene oxides can only be removed from the polycarbodiimides in a laborious and incomplete manner (e.g. DE-A 2 504 400, DE-A 2 552 350, EP-A 609698). Thus, removal of these catalysts by simple, conventional means, for example by distillation, is only possible to a small extent, as demonstrated by Example 3 in the experimental section of the present document.

The retention of such phosphorus organyls in the product can, however, have a negative effect on its storage stability. In order to stop the carbodiimidization reaction at a desired NCO content, the phospholene oxide catalyst must be deactivated, which can be achieved by alkylation, silylation or protonation of the P=O group. Such stopping, however, is often not sufficiently effective such that postreaction may occur in the product during storage. Carbon dioxide is released in the process. This leads to a pressure build-up, for example in the storage containers, in particular in the event of prolonged storage and a rise in temperature. This can be counteracted, for example, by increasing the amount of stoppers. However, the use of stoppers known in the prior art (e.g. EP-A-515 933, EP-A609 698, U.S. Pat. No. 6,120,699) in the amounts required for this purpose often results in discoloration of the product.

DETAILED DESCRIPTION OF THE INVENTION

One object of the present invention was therefore to provide a simple process for preparing polycarbodiimides having the lowest possible residual amounts of carbodiimidization catalyst and thus not having the stated disadvantages of the prior art.

The object stated above was achieved by the subject matter of the present invention.

The present invention relates to a process for preparing polyisocyanates containing carbodiimide groups, in which in a first step at least one monomeric di- and/or polyisocyanate, in the presence of at least one phosphetane-1-oxide of the general formula I

Formula I in which R is a monovalent organic radical having 1 to 6 carbon atoms, which may be saturated or unsaturated or aromatic and branched or unbranched and may have heteroatoms such as nitrogen or oxygen, and is preferably a monovalent organic, saturated, aromatic, branched or unbranched radical having 1 to 6 carbon atoms, is subjected to a carbodiimidization reaction and in a second step the phosphetane-1-oxide(s) is/are removed from the reaction product of the first step, preferably by distillation.

Particular preference is given to using 1,2,2,3,4,4-hexamethylphosphetane-1-oxide and/or 1-ethyl-2,2,3,4,4-pentamethylphosphetane-1-oxide and/or 1-phenyl-2,2,3,4,4-pentamethylphosphetane-1-oxide as phosphetane-1-oxide(s). Most preferably, 1,2,2,3,4,4-hexamethylphosphetane-1-oxide is used.

The phosphethane-1-oxides to be used in the process according to the invention can be separated off and recovered from the reaction product in a simple manner by means of distillation. This possibility of recovering the catalyst makes the process extremely economical. In addition, the catalysts to be used are significantly cheaper to produce than the phospholene oxides used in the prior art (in the experimental section of the present document, an example of a cost-effective production method for 1,2,2,3,4,4-hexamethylphosphetane-1-oxide and/or 1-ethyl-2,2,3,4,4-pentamethylphosphetane-1-oxide is described.)

The possibility of using phosphetane oxides as carbodiimidization catalysts is already referred to in general terms in DE 23 42 148 A (page 2, 3rd paragraph): "it is further known that phosphetane oxides can also be used as carbodiimidization catalysts." However, the text does not make any further statements on this. No reference is made to selected phosphetane oxides, such as, for example, 1,2,2,3,4,4-hexamethylphosphetane-1-oxide or 1-ethyl-2,2,3,4,4-pentamethylphosphetane-1-oxide, which are particularly preferred in the process according to the invention, nor is there any indication that phosphetane oxides can largely be removed from the resulting reaction mixture by distillation.

In the context of the present invention, "removal of the phosphetane-1-oxide(s)" or "separation of the phosphetane-1-oxide(s)" is to be understood as meaning that the polycarbodiimides obtainable by the process according to the invention have a phosphorus content determined by elemental analysis (ICP-OES, DIN ISO 17025) of preferably ≤450 ppm, more preferably ≤300 ppm, even more preferably ≤220 ppm. Using 1,2,2,3,4,4-hexamethylphosphetane-1-oxide as catalyst, the phosphorus content determined by elemental analysis is very especially preferably ≤100 ppm, more preferably ≤25 ppm and most preferably ≤20 ppm.

The present invention also relates to polyisocyanates containing carbodiimide groups having a phosphorus content of preferably ≤100 ppm, more preferably ≤25 ppm, even more preferably ≤20 ppm, determined by elemental analysis (ICP-OES, DIN ISO 17025), obtainable by the process according to the invention.

First Process Step

To carry out the process according to the invention, it is possible in principle to use any known aliphatic, cycloaliphatic, araliphatic and aromatic di- or polyisocyanates of the prior art, individually or in any desired mixtures with one another.

Examples include: methylene diisocyanate, dimethylene diisocyanate, trimethylene diisocyanate, tetramethylene diisocyanate, pentamethylene diisocyanate, hexamethylene diisocyanate (HDI), dipropyl ether diisocyanate, 2-methylpentane-1,5-diisocyanate, 2,2-dimethylpentane diisocyanate, 3-methoxyhexane diisocyanate, octamethylene diisocyanate, 2,2,4-trimethylpentane diisocyanate, 2,4,4-trimethyl-1,6-hexane diisocyanate, 2,2,4-trimethyl-1,6-hexane diisocyanate, nonamethylene diisocyanate, decamethylene diisocyanate, 3-butoxyhexane diisocyanate, 1,4-butylene glycol dipropyl ether diisocyanate, thiodihexyl diisocyanate, metaxylylene diisocyanate, paraxylylene diisocyanate, tetramethylxylylene diisocyanate, 4,4'-dicyclohexylmethane diisocyanate (H12MDI), isophorone diisocyanate (IPDI), hydrogenated xylylene diisocyanate ($H_6$XDI), 1,12-diisocyanatododecane (DDI), norbornane diisocyanate (NBDI), 2,4-bis (8-isocyanatoctyl)-1,3-dioctylcyclobutane (OCDI), naphthylene-1,5-diisocyanate, 1,3- and 1,4-bis (isocyanatomethyl)benzene (XDI), 2,4- and 2,6-tolylene diisocyanate (TDI), bis(4-isocyanatophenyl)methane (4,4'MDI), 4-isocyanatophenyl-2-isocyanatophenyl methane (2,4'MDI) and polynuclear products which are accessible by formaldehyde-aniline polycondensation and subsequent conversion of the resulting (poly)amines to the corresponding (poly)isocyanates (polymer MDI).

Preference is given to aliphatic and cycloaliphatic diisocyanates. Particular preference is given to isophorone diisocyanate (IPDI), hexamethylene diisocyanate (HDI), hydrogenated xylylene diisocyanate ($H_6$XDI), dicyclohexylmethane 4,4'-diisocyanate (H12MDI). Most preferably, the cycloaliphatic polyisocyanate is dicyclohexylmethane 4,4'-diisocyanate (H12MDI).

It is irrelevant by which methods the aforementioned isocyanates are generated, i.e. with or without use of phosgene.

The conversion of aromatic di-/polyisocyanates to polycarbodiimide takes place in the presence of up to 20 ppm by weight carbodiimidization catalyst. The conversion of aliphatic, cycloaliphatic and/or araliphatic di-/polyisocyanates to polycarbodiimide takes place in the presence of 0.1-3.0% by weight, preferably 0.1-2.0% by weight, carbodiimidization catalyst. The ppm and % figures refer in each case to the amount of di-/polyisocyanate used.

The phosphetane-1-oxide(s) already described in more detail above are used as carbodiimidization catalysts.

The phosphetane-1-oxides may be used in a mixture with other carbodiimidization catalysts, while complying with the quantities specified above. For example, phosphane oxides, phospholane oxides and phospholene oxides, and sulfo and imino analogs thereof, may also be used. However, their content, based on the amount of phosphetane-1-oxides, should not exceed 80% by weight, preferably 50% by weight, particularly preferably 20% by weight.

Most preferably, however, the phosphetane-1-oxides are not used in admixture with these catalysts.

In other words, it is most preferred to use exclusively phosphetane-1-oxides as carbodiimidization catalysts in the process.

The conversion of di-/polyisocyanate to polycarbodiimide takes place at a temperature in the range of 130 to 230° C., preferably in the range of 140 to 210° C., particularly preferably in the range of 150 to 200° C.

The conversion of di-/polyisocyanate to polycarbodiimide may be carried out in the presence or absence of solvents. It is preferably carried out in the presence of at least one solvent. Preference is given to using solvents having a boiling point at standard pressure (1013 mbar) of ≥120° C. These include, for example, monochlorobenzene (MCB), ortho-dichlorobenzene (OCB), chlorotoluenes (any isomer/mixture), trichlorobenzene, high-boiling ethers such as dibutyl ether, diphenyl ether, ditolyl ether.

Second Process Step

In the second process step, the catalyst is removed from the reaction mixture obtained from step 1, preferably by distillation.

Should unreacted monomeric di- and/or polyisocyanate be present in the reaction mixture obtained from the first process step, this is preferably not removed together with the catalyst in the second process step.

If process step 1 is carried out in the presence of a solvent, the solvent and catalyst can be separated off together from the reaction mixture obtained from process step 1 in one distillation step or else separately in two or more distillation steps. Solvent and catalyst are preferably separated off at the same time.

The distillation is preferably carried out at reduced pressure, i.e. in a vacuum of ≤250 mbar, particularly preferably of ≤100 mbar, especially preferably of ≤50 mbar, most preferably of ≤20 mbar.

The distillation is preferably carried out at temperatures up to 250° C., particularly preferably at temperatures up to 200° C.

The dependence of the boiling point of a substance on the ambient pressure is well known to those skilled in the art. The distillation temperature to be set as a function of the pressure during the distillation is therefore determined by the person skilled in the an on the basis of his specialist knowledge.

As distillation methods, all common industrial distillation processes are conceivable, such as (continuously or discontinuously operated) bubble distillations and or thin-film distillations, optionally in the particular embodiment of short-path distillation.

Experimental Section

All reactions were conducted under a nitrogen atmosphere unless stated otherwise.

The diisocyanates used are products of Covestro Deutschland AG, D-51368 Leverkusen, all other commercially available chemicals were obtained from Aldrich, D-82018 Taufkirchen, unless stated otherwise.

The phosphetane oxide catalysts 1,2,2,3,4,4-hexamethylphosphetane-1-oxide and 1-ethyl-2,2,3,4,4-pentamethylphosphetane-1-oxide were prepared according to literature [T. V. Nykaza, T. S. Harrison, A. Ghosh, R. A. Putnik and A. T. Radosevich, *J Am Chem Soc* 2017, 139, 6839-6842]. The reference catalyst phospholene oxide (in the present case as an isomeric mixture of 1-methyl-2 (and/or 3)-phospholene-1-oxide) was obtained from Clariant.

The phosphorus content was determined by elemental analysis (ICP-OES, DIN-ISO 17025).

NCO values were determined volumetrically in accordance with DIN-EN ISO 1 1909.

EXAMPLES

Example 1: Comparative Example

Catalyst: Phospholene Oxide

To $H_{12}MDI$ (20.0 g, 75.8 mmol, 1.0 eq) in chlorobenzene (2.22 g) was added phospholene oxide at a mole fraction of xCat=1.5%. The reaction mixture was heated to 150° C. and samples of ~500 mg were taken at regular intervals to determine the $NCO_t$ value. From the NCO values determined, the conversion of the free isocyanate groups to carbodiimide groups was calculated according to $$\text{Conversion}_t = (NCO_{t=0} - NCO_t)/NCO_{t=0}$$

where $NCO_t$ is the measured NCO value at time t and $NCO_{t=0}$ is the NCO value at time t=0. In addition, the TOF (turnover frequency) at time t was calculated according to $$TOF_t = (n(NCO)_t - n(NCO)_{t=0})/(n(Cat)*t)$$

where $n(NCO)_t$ is the amount of NCO groups at time t and $n(NCO)_{t=0}$ is the amount of NCO groups at time t=0. n(Cat) is the amount of catalyst and t is the reaction time. The results are shown in the table below.

| Reaction time/h | Conversion/% | TOF/s$^{-1}$ |
|---|---|---|
| 00:00 | 0.0 | |
| 00:30 | 13.5 | 0.0097 |
| 01:00 | 22.6 | 0.0081 |
| 01:30 | 25.2 | 0.0060 |
| 03:05 | 42.5 | 0.0050 |
| 04:00 | 51.4 | 0.0046 |
| 05:00 | 57.0 | 0.0041 |
| 06:00 | 64.1 | 0.0038 |

Example 2: Inventive

Catalyst: Phosphetane Oxide

The procedure was as described above, with the difference that 1,2,2,3,4,4-hexamethylphosphetane-1-oxide was used as catalyst. The results are shown in the table below.

| Reaction time/h | Conversion/% | TOF/s-1 |
|---|---|---|
| 00:00 | 0.0 | |
| 00:30 | 1.4 | 0.0009 |
| 01:00 | 4.1 | 0.0013 |
| 01:30 | 6.7 | 0.0015 |
| 03:45 | 16.6 | 0.0015 |
| 04:15 | 18.6 | 0.0014 |
| 06:00 | 25.9 | 0.0014 |

Example 3: Comparative Example

To $H_{12}MDI$ (20.0 g, 75.8 mmol, 1.0 eq) in chlorobenzene (2.22 g) was added phospholene oxide (0.20 g). The reaction mixture was heated to 200° C. for 8 h. A distillation head was then attached and the mixture was distilled at 200° C. and 20 mbar. The residue was investigated for P content by elemental analysis and a value of 480 mg/kg was found, which corresponds to 18% of the original amount of catalyst.

Example 4: Inventive

To $H_{12}MDI$ (20.0 g, 75.8 mmol, 1.0 eq) in chlorobenzene (2.22 g) was added 1-ethyl-2,2,3,4,4-pentamethylphosphetane-1-oxide (0.20 g). The reaction mixture was heated to 200° C. for 8 h. A distillation head was then attached and the mixture was distilled at 200° C. and 20 mbar. The residue was investigated for P content by elemental analysis and a value of 200 mg/kg was found, which corresponds to 11% of the original amount of catalyst.

Example 5: Inventive

To $H_{12}MDI$ (20.0 g, 75.8 mmol, 1.0 eq) in chlorobenzene (2.22 g) was added 1,2,2,3,4,4-hexamethylphosphetane-1-oxide (0.20 g). The reaction mixture was heated to 200° C. for 8 h. A distillation head was then attached and the mixture was distilled at 200° C. and 20 mbar. The residue was investigated for P content by elemental analysis and a value of 18 mg/kg was found, which corresponds to 1% of the original amount of catalyst.

The invention claimed is:

1. A process for preparing polyisocyanates comprising carbodiimide groups, comprising:
    a first step wherein at least one monomeric di- or polyisocyanate, is subjected to a carbodiimidization reaction in the presence of at least one phosphetane-1-oxide selected from the group consisting of 1,2,2,3,4,4-hexamethylphosphetane-1-oxide, 1-ethyl-2,2,3,4,4-pentamethylphosphetane-1-oxide, and mixtures thereof, and
    a second step in which the phosphetane-1-oxide is removed from a reaction product of the first step by distillation without removing unreacted monomeric di- or polyisocyanate from the first step together with the phosphetane-1-oxide.

2. The process of claim 1, wherein the carbodiimidization reaction is carried out at a temperature in the range from 130 to 230° C.

3. The process of claim 1, wherein the carbodiimidization reaction is carried out in the presence of at least one solvent.

4. The process of claim 3, wherein the solvent has a boiling point under standard pressure (1013 mbar) of ≥120° C.

5. The process of claim 3, wherein the solvent and the phosphetane-1-oxide are removed together from the reaction mixture obtained from the first step in the second step.

6. The process of claim 1, wherein the second step is carried out by distillation at a pressure less than 1013 mbar.

7. The process of claim 1, wherein the carbodiimidization reaction is carried out at a temperature in the range from 140 to 210° C.

8. The process of claim 1, wherein the phosphetane-1-oxide is 1,2,2,3,4,4-hexamethylphosphetane-1-oxide.

9. The process of claim 1, wherein the phosphetane-1-oxide is used as the exclusive carbodiimidization catalyst in the carbodiimidization reaction in the first step.

10. The process of claim 1, wherein the at least one monomeric di- or polyisocyanate is selected from the group consisting of aliphatic, cycloaliphatic, araliphatic and aromatic di- or polyisocyanates.

11. The process of claim 10, wherein
    aliphatic, cycloaliphatic or araliphatic monomeric di- or polyisocyanates are used in the process and the carbodiimidization reaction is effected in the presence of ≤20 ppm by weight carbodiimidization catalyst, based on an amount of the at least one monomeric di- or polyisocyanate,
    wherein the carbodiimidization catalyst is the phosphetane-1-oxide, in a mixture with ≤80% by weight, based on the amount of phosphetane-1-oxide, of further compounds catalyzing the carbodiimidization reaction that are different from the phosphetane-1-oxide.

12. The process of claim 11, wherein the carbodiimidization catalyst is exclusively the phosphetane-1-oxide.

13. The process of claim 10, wherein aromatic monomeric di- or polyisocyanates are used in the process and the carbodiimidization reaction is effected in the presence of 0.1 to 3.0% by weight carbodiimidization catalyst, based on an amount of the at least one monomeric di- or polyisocyanate,
   and wherein the carbodiimidization catalyst is the phosphetane-1-oxide, in a mixture with ≤80% by weight, based on the amount of phosphetane-1-oxide, of further compounds catalyzing the carbodiimidization reaction that are different from the phosphetane-1-oxide.

14. The process of claim 13, wherein the carbodiimidization catalyst is exclusively the phosphetane-1-oxide.

15. The process of claim 10, wherein aromatic monomeric di- or polyisocyanates are used in the process and the carbodiimidization reaction is effected in the presence of 0.1 to 2.0% by weight carbodiimidization catalyst, based on an amount of the at least one monomeric di- or polyisocyanate,
   and wherein the carbodiimidization catalyst is the phosphetane-1-oxide, in a mixture with ≤80% by weight, based on the amount of phosphetane-1-oxide, of further compounds catalyzing the carbodiimidization reaction that are different from the phosphetane-1-oxide.

16. The process of claim 15, wherein the carbodiimidization catalyst is exclusively the phosphetane-1-oxide.

* * * * *